United States Patent [19]
Kao et al.

[11] Patent Number: 5,857,590
[45] Date of Patent: Jan. 12, 1999

[54] CONTROLLED MULTI-NOZZLE LIQUID DISPENSING SYSTEM

[75] Inventors: Yao-Hwan Kao, Hsin-chu Hsien; Chi-Ren Hsieh, Miao-Li Hsien, both of Taiwan

[73] Assignee: Taiwan Semiconductor Manufacturing Company, Ltd., Hsin-Chu, Taiwan

[21] Appl. No.: 826,717

[22] Filed: Apr. 7, 1997

[51] Int. Cl.$^6$ .................................................. G01F 11/00
[52] U.S. Cl. ........................ 222/1; 222/330; 222/399
[58] Field of Search ............................ 222/135, 1, 330, 222/399

[56] References Cited

U.S. PATENT DOCUMENTS

| | | | |
|---|---|---|---|
| 5,148,945 | 9/1992 | Geatz | 222/135 |
| 5,150,822 | 9/1992 | Eitner, Jr. et al. | 222/399 |
| 5,330,072 | 7/1994 | Ferri, Jr. et al. | 222/135 |
| 5,568,882 | 10/1996 | Takacs | 222/399 |

*Primary Examiner*—Philippe Derakshani
*Attorney, Agent, or Firm*—George O. Saile; Stephen B. Ackerman

[57] ABSTRACT

A flow system that is suitable for controlled dispensing of liquids such as anti-reflection coatings is described. The system is driven by a gas at high pressure from a single dispensing bottle. On emerging from the dispensing bottle the fluid is directed into one of two branches, each such branch being terminated by its own nozzle. By inserting a needle valve in each branch of the flow system, between the branch point and the nozzle, control of the amount of liquid dispensed by each nozzle is separately achieved and a change in flow through one nozzle does not affect the flow through the other nozzle.

14 Claims, 1 Drawing Sheet

CONTROLLED MULTI-NOZZLE LIQUID DISPENSING SYSTEM

BACKGROUND OF THE INVENTION (1) Field of the Invention

The invention relates to the general field of liquid dispensing with particular reference to anti-reflection coatings for use in photoresist processing.

(2) Description of the Prior Art

Anti-reflection coatings (ARCs) are widely used in integrated circuit manufacturing as an aid to improving the quality of photoresist patterns. In the absence of such a coating there is the possibility that standing waves of the exposing radiation may be established within the photoresist layer, particularly if the layer that is to be patterned is a metal. It is thus common practice to coat the surfaces of metal layers with an ARC prior to the application of the photoresist.

A variety of methods are in use in the industry for applying ARCs to surfaces. The particular approach with which the present invention is concerned is spin coating wherein a liquid is dispensed onto the surface of a spinning wafer through a nozzle. We have been unable to find any prior art that teaches the dispensing system disclosed by the present invention. U.S. Pat. No. 5,536,534 shows a method of applying photoresist at a high pressure but this method differs significantly from that of the present invention.

SUMMARY OF THE INVENTION

It has been an object of the present invention to provide an apparatus and method that facilitates improved dispensation of a liquid.

Another object of the present invention has been that it be capable of dispensing from several nozzles simultaneously, the output of each nozzle being individually adjustable without regard to the performance of the other nozzles.

A still further object of the present invention is that it be suitable for laying down a layer of an anti-reflection coating.

These objects have been achieved by means of a flow system that is driven by a gas at high pressure from a single dispensing bottle. On emerging from the dispensing bottle the fluid is directed into one of several branches, each such branch being terminated by its own nozzle. By inserting a needle valve in each branch of the flow system, between the branch point and the nozzle, control of the amount of liquid dispensed by each nozzle is separately achieved and a change in flow through one nozzle does not affect the flow through the other nozzles.

DESCRIPTION OF THE PREFERRED EMBODIMENTS

Figure 1:
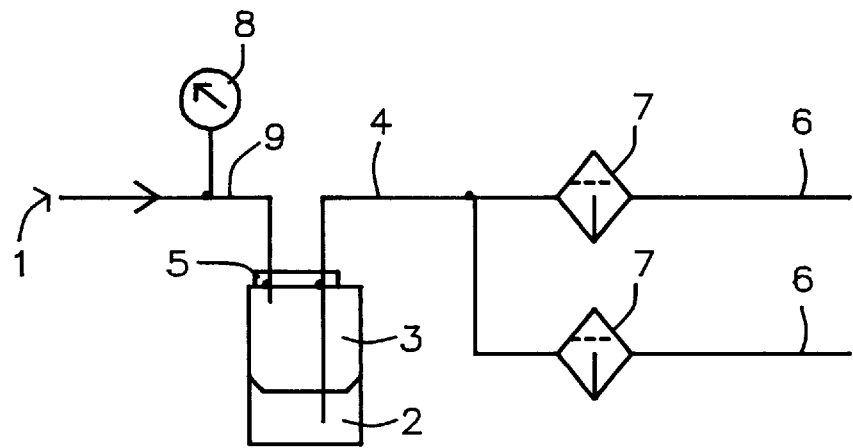
FIG. 1 illustrates the dispensing system that we had previously been using at our facility.

The key novel features of the present invention are most easily demonstrated by a comparison with the method and apparatus that had previously been in use at our manufacturing facility. Referring now to FIG. 1 we show there a schematic representation of the system that has been replaced by the present invention. Liquid 2, that is to be directed to a nozzle where it will be dispensed for use as an ARC (or possibly some other coating), is stored in dispensing bottle 3. Branch tube 4 has its single end immersed in the liquid and extends to near the bottom of 3.

At its other end, tube 4 divides into multiple branches 6, of which two are shown but which could be more. Each branch 6 terminates in a nozzle which is not shown in the diagram but which is of a standard type used in the industry. Usually (though not mandatorilly) a filter 7 is located in each branch ahead of the nozzle.

In order to force liquid to flow through 4 and out through 6 inlet tube 9 is inserted into dispensing bottle 3, terminating at a point above the surface of liquid 2. Together with outlet tube 4, it enters the dispensing bottle by way of seal 5, thereby ensuring that 3 is gas tight. Thus, when a gas at some pressure is admitted at inlet 1, liquid 2 is forced to flow into branch tube 4 and, eventually out through branch outlets 6.

With the system shown in FIG. 1, all nozzles (i.e. those attached to outlets 6) dispense liquid simultaneously and at rates determined by a common factor, namely the pressure of the gas in 3 which maintains a constant value throughout. This requires that said gas pressure be kept low throughout the dispensing operation (symbolised by the low reading on gas gauge 8 in FIG. 1) to avoid expelling liquid too quickly. Since all dispensing by the nozzles will have to be terminated simultaneously, the possiblity is always present that one or more of the nozzles will over-dispense while others will under-dispense liquid. The greater the number of outlets 6 to the branch tube, the greater the possibility that this may happen. Furthermore, should one of the filters begin to clog up while the other filters remain clear, it will need to be changed immediately to avoid over-dispensing by the other branches. This leads to an under utilization of the filters in general.

Figure 2:
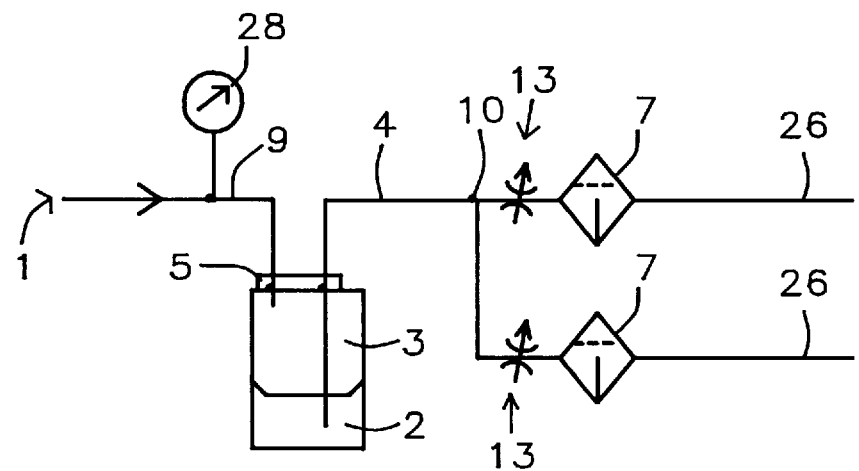
FIG. 2 illustrates a dispensing system that embodies the present invention.

Referring now to FIG. 2, the system that embodies the present invention is schematically shown. Many of the parts are similar to that already seen in FIG. 1. Thus, liquid 2 is stored in dispensing bottle 3. We have used the system primarily for dispensing ARCs such as TOP ARCs, but it could also be used for dispensing other liquids such as thinner or deionized water. Branch tube 4 has its single end immersed in the liquid and extends to near the bottom of 3. At its other end, tube 4 divides into multiple branches 6, of which two are shown but which could be more. Each branch 6 terminates in a nozzle (not shown) which is of a standard type used in the industry.

A key difference relative to the system seen in FIG. 1 is the presence of a needle valve 13 located in each branch between the branch point 10 and the outlet 26. The needle valve that we have preferred to use has been of the metal free type but any needle valve capable of handling the pressure and flow requirements of the system could have been used. As before, it is optional to include a filter 7 between needle valve 13 and outlet 26.

In order to force liquid to flow through 4 and out through 6 inlet tube 9 is inserted into dispensing bottle 3, terminating at a point above the surface of liquid 2. Together with outlet tube 4, it enters the dispensing bottle by way of seal 5, thereby ensuring that 3 is gas tight. Now, when a gas at some pressure is admitted at inlet 1, the rate at which liquid 2 will flow into branch tube 4 and, eventually, out through branch outlets 6, will depend on the settings of the individual needle valves 13. Since the needle valves may be individually set, the flow through each of the branches may be controlled separately.

With the system shown in FIG. 2, all nozzles (i.e. those attached to outlets 26) dispense liquid at rates determined by the settings of their individual needle valves. This allows the gas pressure in 3 to be kept at a fixed, high value throughout the dispensing operation (symbolised by the high reading on gas gauge 28 in FIG. 2). It now becomes possible to terminate dispensing at each nozzle when the correct amount of fluid has been dispensed by that nozzle, not after some average time determined for all nozzles. For the gas used to drive the liquid we have generally preferred nitrogen, but other gases such as air could also have been used. The gas pressure that we have found effective has been about 0.6 kg/cm$^2$ but any pressure in the range of from about 0.55 to 0.65 kg/cm$^2$ could have been used.

As a consequence, the number of branches in the system is no longer limited by variations in flow impedance between different branches. In particular, should one of the filters begin to clog up while the other filters remain clear, there will be no need to change it immediately to avoid over-dispensing by the other branches. A slight adjustment to the needle valve concerned will be sufficient to restore flow to normal and the other dispensing nozzles will not be affected. The number of branches that can be reliably supported by a system of this type is generally 2.

While the invention has been particularly shown and described with reference to the preferred embodiments thereof, it will be understood by those skilled in the art that various changes in form and details may be made without departing from the spirit and scope of the invention.

What is claimed is:

1. A liquid dispensing system comprising:
    a dispensing bottle in which a liquid, having a surface, is contained;
    an inlet tube having a first end, external to the dispensing bottle and connected to a source of high pressure, and a second end, internal to the dispensing bottle and located above said surface;
    an outlet tube having a first end, internal to the dispensing bottle and below said surface, and a second end external to the dispensing bottle;
    a seal for the dispensing bottle through which both the inlet and the outlet tube pass;
    a branch tube having a single inlet end and a plurality of outlet ends;
    a leak free connection between the second end of the outlet tube and the inlet end of the branch tube;
    a plurality of needle valves each having an inlet end, connected to an outlet end of the branch tube, and an outlet end; and
    a leak free connection between the outlet end of each needle valve and a nozzle suitable for dispensing the liquid.

2. The system of claim 1 wherein the liquid is an ARC or thinner or deionized water.

3. The system of claim 1 wherein the pressure source is a container of gas, said gas being taken from the group consisting of nitrogen and air.

4. The system of claim 3 wherein the pressure source is at a pressure between about 0.55 and 0.65 kg/cm$^2$.

5. The system of claim 1 further comprising a filter located between the branch tube and the nozzle.

6. The system of claim 1 wherein the needle valves are the metal free type.

7. A method for dispensing a liquid, comprising:
    providing a dispensing bottle and partially filling said bottle with said liquid;
    connecting the dispensing bottle to a gas at a high pressure thereby causing the liquid to flow from the dispensing bottle into an outlet tube, having a plurality of branches that direct the liquid to dispensing nozzles; and
    controlling the flow of the liquid through each branch by means of a needle valve in each branch.

8. The method of claim 7 wherein the liquid is an ARC or thinner or deionized water.

9. The method of claim 7 wherein the gas is taken from the group consisting of nitrogen and air.

10. The method of claim 9 wherein the pressure of the gas is between about 0.55 and 0.65 kg/cm$^2$.

11. The method of claim 7 wherein the number of branches is 2.

12. The method of claim 7 further comprising providing a filter between each needle valve and nozzle.

13. The method of claim 7 wherein the needle valves are the metal free type.

14. The method of claim 7 wherein said liquid is an ARC.

* * * * *